Figure 1:
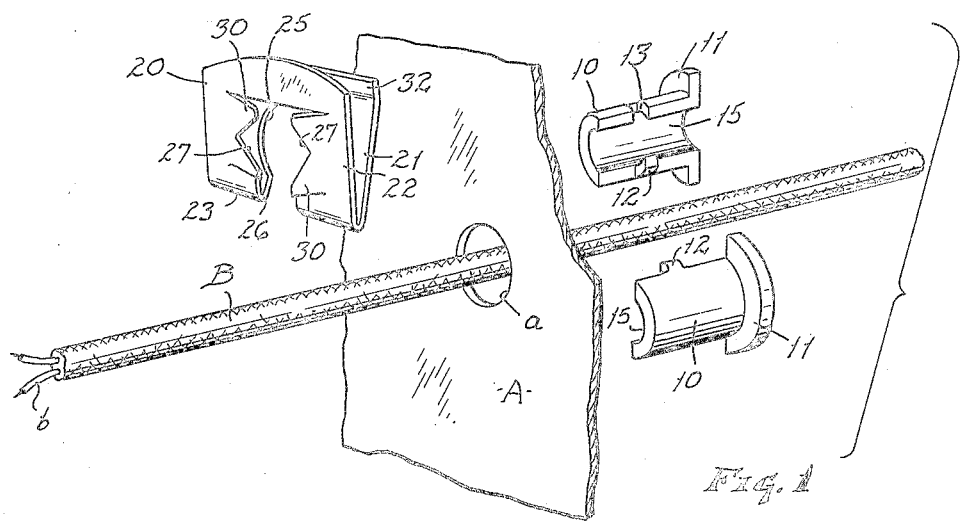

Dec. 26, 1944.   G. A. TINNERMAN   2,365,785
FASTENING DEVICE
Filed April 16, 1942

Inventor
George A. Tinnerman,
By Dales Tear & McBean,
Attorneys.

Patented Dec. 26, 1944

2,365,785

UNITED STATES PATENT OFFICE 2,365,785

FASTENING DEVICE

George A. Tinnerman, Cleveland, Ohio, assignor to Tinnerman Products, Inc., Cleveland, Ohio, a corporation of Ohio Application April 16, 1942, Serial No. 439,150

10 Claims. (Cl. 174—153)

This invention relates to a device for positioning a cable or rod passing through a plate or partition while allowing movement of one relative to the other in a direction longitudinally of the cable or rod. My fastening device is well adapted, for instance, for positioning an electric cable passing through a partition in an airplane, where there is some play between parts in use and it is important that fraying of the cable by contact with the partition be avoided. It is a feature of my invention that the parts of the fastener are adapted to be mounted after the cable or rod is in place, extending through opening in the partition.

In carrying out my invention I provide a two-part bushing, which may be of insulating material, the two sections being adapted to be placed together about the cable or rod and then shoved lengthwise thereof through the surrounding opening in the partition. My invention further provides a spring metal clip adapted to be placed about the projecting portion of the mounted bushing and by engaging such bushing and the face of the partition holding the bushing effectively in place in the partition. This positions the cable or rod with reference to the partition and at the same time allows it to play or move through the partition as may be required.

My invention includes not only the combination of the bushing and clip but also a special form of separable bushing and a special character of clip, each of which is useful in itself. Such invention is illustrated in the drawing hereof and is hereinafter more fully explained with reference to such drawing.

Figure 4:
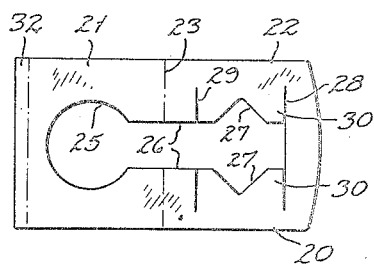
Figure 2:
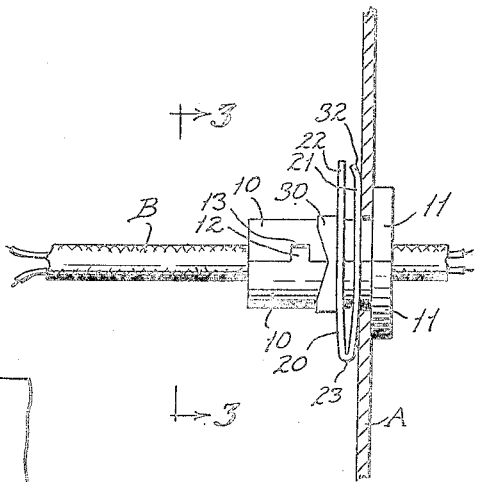
Figure 3:
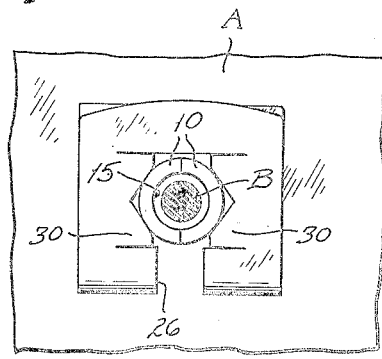

In the drawing, Fig. 1 is a dismounted perspective showing a partition, a cable passing through it and my bushing and fastening device, all in detached position; Fig. 2 is a side elevation of the parts shown in Fig. 1 completely assembled; Fig. 3 is an end view of the fastening device in position, being a section through the cable, as indicated by the line 3—3 on Fig. 2 looking toward the fastener; Fig. 4 is a plan of the spring clip of the fastener before the same is folded into the normal V-shape shown in Fig. 1.

In Figs. 1 and 2, A indicates a suitable plate or wall having a circular opening $a$ through it; B indicates a cable or rod passing centrally through the opening and well out of contact therewith. As shown the member B is an electric cable having two conductors $b$ surrounded by insulating covering.

The bushing of this invention is made in two identical halves which cooperate with each other to make a complete cylindrical sleeve with a circular flange or head. In effecting this, each bushing member 10 has a semi-cylindrical body with a semi-annular flanged head 11. One edge of the body is provided with a lug 12 projecting arcuately and the other edge of the body has a notch 13 corresponding in position and dimension to the projecting lug.

When the two parts of the bushing are placed together, each of the lugs 12 occupies the notch 13 of the other member, thus preventing longitudinal shifting of one part of the bushing with reference to the other, and making a complete tube with a cylindrical bore and an annular external flange.

When it is desired to mount the bushing on a cable or rod B already in place, extending through such an opening as indicated at $a$, the two parts of the bushing are placed together from opposite sides on the cable thus making a complete bushing surrounding the cable. The bore of the bushing provided by the two semi-cylindrical concavities 15 in the members 10 is preferably only slightly larger than the exterior of the cable so that when the bushing parts are brought together about the cable and then shoved lengthwise through the opening in the partition the cable is accurately positioned centrally of the opening, and at the same time is allowed to move freely through the bushing as occasion may require.

When the bushing is in position, the head 11, provided by the bushing flanges, abuts that face of the partition through which the bushing has been shoved into position. To hold the bushing in this position I apply to it on the other face of the partition my fastening clip, which I will now describe.

The fastening clip, designated 20, is a single piece of spring sheet metal bent intermediately upon itself to provide two legs 21 and 22 which flare at a very acute angle to each other from the line of bend 23 which is about the middle of the strip. I form in the strip a hole having a round portion 25 in the region which is to form the leg 21, and then a parallel-sided portion 26 leading lengthwise of the strip to a leg 22, where the hole is diverted toward the edges of the strip by opposed V-shaped enlargements 27. I make a slit 28 crosswise of the leg 22 at the end of the opening, and intermediately a pair of aligned slits 29 at a corresponding distance on the other side of the V-shaped enlargements of the opening. The slits 28 and 29 provide between them, on opposite sides of the opening, a pair of tongues 30 each having one of the V notches 27. These tongues are bent outwardly from the plane of the strip or leg into the inclined position shown in Figs. 1 and 2.

The central portion 26 of the opening through the fastener, which comes at the bottom of the doubled strip when in position in Fig. 1, has a width somewhat greater than the diameter of the cable or rod B. Accordingly, after the bushing is in place the V-shaped fastener may be placed across the cable beyond the end of the bushing and may then be shoved lengthwise of the cable onto the bushing.

The round portion 25 of the opening of the clip is only slightly larger than the external diameter of the bushing sleeve and hence may make a readily slidable fit thereon, while the V-shaped edges of the spring tongues snugly engage the sides of the bushing. When the clip is being put in place its free outer leg 22 is shoved slightly toward the partition until substantially parallel therewith. The notches at the sharp edges of the tongues 30 in this operation bite slightly into the bushing to form struts from the general plane of the clip leg 22 to the bushing wall. At the same time the resilience of the clip, tending to flare the legs into the condition shown in Fig. 1, applies a longitudinal stress to the bushing which holds the head thereof tightly against the opposite side of the plate A.

I prefer to bend the extreme end of the leg 21 of the clip slightly toward the other leg, as indicated at 32, and this bent portion provides a stop limiting the movement of the leg 22 having the tongues toward the other leg. In applying such clip to the bushing, after it is first placed thereon, it is only necessary to press the leg 22 adjacent its free end as far as it will go toward the partition, that is, until it contacts with the bent edge 32 of the other leg, whereupon the strut tongues 30, having obtained their hold on the bushing, will allow the free leg 22 to return only very slightly but sufficiently to hold the head of the bushing snugly against the opposite wall of the partition, as shown in Fig. 2.

It will be seen that my fastening device is extremely simple in construction, comprising merely my peculiar separable bushing and my peculiar retaining clip, and that these parts may be readily mounted on the cable or rod passing through an opening in the partition and will definitely position such cable or rod, and at the same time will allow it to move through the partition, either to effect slight play or for some other operation requiring relative movement. The bushing may be readily made of insulating material. This enables an electric cable to be thoroughly protected from possible short circuiting by a metal plate through which it may pass.

By making the bushing of identical halves the cost of manufacture is maintained at a minimum, while the maintenance of a supply of bushings is simplified by having only one kind of bushing member. The fastening clip may be cheaply stamped and cut from a flat strip or spring metal, as indicated in Fig. 4, and thereafter bent into the V-shaped normal condition illustrated in Fig. 1.

I claim:

1. A fastening device comprising a two-part bushing, each part comprising a semi-cylindrical member with a flange, and a retaining clip comprising a strip of metal doubled on itself to provide two legs, each with an opening to extend about the bushing, the opening in one leg being substantially round and slightly larger in diameter than the exterior of the bushing, and the opening in the other leg being bounded on opposite sides by V-shaped edges of tongues bent from the plane of that leg to provide oblique struts adapted to engage the bushing, said two openings being connected by a slot across the bend of the clip, said slot having a width as great as the internal diameter of the bushing.

2. A fastening device comprising in combination a two-part bushing, each substantially semi-cylindrical with a projecting lug at one longitudinal edge, there being a corresponding notch in the other longitudinal edge, and a fastening clip bent on itself to provide two legs, one leg having an opening adapted to freely embrace the bushing and the other leg being provided with a pair of oblique resilient tongues to snugly engage the bushing, said two openings being connected by a slot across the bend of the clip.

3. A fastening member comprising a strip of resilient material bent on itself to provide two V-shaped legs, an opening through each leg and an opening of a reduced extent extending across the bend of the fastener and communicating with the two openings first mentioned, one of the leg openings comprising a space between two opposed tongues cut from the body of the strip and diverted to extend at an acute angle to the plane of that leg.

4. A fastening clip comprising a strip of sheet metal bent on itself into a substantially V-form to provide two legs at an acute angle to each other, a round opening through one of the legs, a substantially registering opening through the other leg having an angular boundary provided by two opposed tongues cut from the latter leg and diverted at an acute angle, each tongue having a V-shaped notch in its edge, and a parallel-sided narrower opening connecting the round opening with the angular opening and extending across the bend of the clip.

5. A sheet metal fastening clip comprising a strip of spring sheet metal bent on itself adjacent the center to provide two legs normally standing at a very acute angle to each other, an opening through each leg in substantial registration to each other, one of the leg openings being bounded by two opposed tongues cut from the material of the leg and bent at an acute angle to the plane thereof, each of said tongues being notched, and an opening of reduced width leading continuously from the space between the tongues across the bend of the clip to the opening in the other leg, the end of the clip beyond one of the openings being bent toward the other leg to provide a stop limiting the approach of the legs.

6. The combination of a plate with a substantially round opening through it, a rod or a cable extending centrally through the opening, a two-part bushing, each part comprising a substantially semi-cylindrical body with a semi-circular flange at the end, said bushing embracing the rod or cable with the body of the bushing occupying the opening in the plate and the flange engaging one face of the plate, and a fastening clip on the other side of the plate comprising a member of sheet material bent on itself to provide two legs at an acute angle to each other, one leg lying against the plate and having an opening freely embracing the bushing body, the other leg having an opening through which the bushing body extends, said two openings being connected by a slot across the bend of the clip the last-mentioned opening being bounded on opposite sides by a pair of resilient spring tongues cut from the body of the leg and diverted in a direction away from said plate into positions oblique to the leg, said tongues snugly engaging the body of the bushing.

7. The combination with a bushing of a sheet metal fastening clip bent on itself to provide two legs lying alongside of each other, a substantially round opening in one of the legs embracing the bushing, two oblique opposed tongues in the other leg separated by an opening substantially aligning with said round opening, said tongues engaging the bushing at opposite sides and an opening across the fold of the clip connecting the space between the tongues with the substantially round opening.

8. A fastening device comprising a two-part bushing divided longitudinally to enable it to embrace a rod or cable in place and a sheet metal V-shaped fastener, one leg of which has an opening embracing the bushing and the other leg of which is provided with an opening and an adjacent obliquely extending spring tongue engaging the bushing, said two openings being connected by an opening of a width substantially as great as the diameter of the bore of the bushing extending from the folding edge of the fastener.

9. A fastening device comprising a split bushing adapted to embrace a member to be positioned and a sheet metal spring clip doubled on itself to provide two normally divergent apertured legs embracing the bushing, one of said legs being formed with portions adapted to bite into the bushing to apply lateral and longitudinal stresses to it to hold it together and in place, the two apertures being connected by a slot across the fold of the clip of less width than the apertures.

10. The combination with a bushing of a sheet metal fastening clip bent on itself to provide two legs, an opening in one of the legs surrounding the bushing, a deformed portion on the other leg at the edge of an opening therethrough, said deformed portion extending in a direction away from both legs and providing an edge engaging the bushing, there being an opening across the fold of the clip connecting the two openings first mentioned and of less width than either of said two openings.

GEORGE A. TINNERMAN.